United States Patent
Sun et al.

(10) Patent No.: US 10,557,021 B2
(45) Date of Patent: Feb. 11, 2020

(54) ARTIFICIAL TIMBER AND METHOD FOR PREPARING ARTIFICIAL TIMBER

(71) Applicant: ZHEJIANG A & F UNIVERSITY, Hangzhou (CN)

(72) Inventors: Qingfeng Sun, Hangzhou (CN); Chao Wang, Hangzhou (CN); Chunde Jin, Hangzhou (CN); Ye Xiong, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 0 days.

(21) Appl. No.: 15/921,015

(22) Filed: Mar. 14, 2018

(65) Prior Publication Data

US 2018/0201765 A1 Jul. 19, 2018

Related U.S. Application Data

(63) Continuation-in-part of application No. PCT/CN2017/098277, filed on Aug. 21, 2017.

(30) Foreign Application Priority Data

Oct. 12, 2016 (CN) .......................... 2016 1 0890490

(51) Int. Cl.
| | |
|---|---|
| *B27N 3/04* | (2006.01) |
| *C08L 1/02* | (2006.01) |
| *C08J 3/00* | (2006.01) |
| *B27N 3/08* | (2006.01) |

(52) U.S. Cl.
CPC ............... *C08L 1/02* (2013.01); *B27N 3/04* (2013.01); *B27N 3/08* (2013.01); *C08J 3/005* (2013.01); *C08J 2301/02* (2013.01); *C08J 2401/08* (2013.01); *C08J 2497/00* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 6,124,384 | A | * | 9/2000 | Shiraishi | B65D 65/466 524/35 |
|---|---|---|---|---|---|
| 8,187,423 | B1 | * | 5/2012 | Glenn | B29C 70/443 162/141 |
| 2010/0075095 | A1 | * | 3/2010 | Johnson | B27N 1/00 428/53 |
| 2014/0342124 | A1 | * | 11/2014 | Zambrzycki | B29C 39/003 428/148 |
| 2016/0115465 | A1 | * | 4/2016 | Hua | C12Y 302/0107 435/99 |

FOREIGN PATENT DOCUMENTS

JP 2016204277 * 12/2016

OTHER PUBLICATIONS

Lignocellulose aerogel. Jlan Le et al. 2011 (Year: 2011).*

* cited by examiner

*Primary Examiner* — Melvin C. Mayes
*Assistant Examiner* — Colette B Nguyen
(74) *Attorney, Agent, or Firm* — IM IP Law; Chai Im; C. Andrew Im

(57) ABSTRACT

An artificial timer and preparing method thereof. The artificial timber includes the following components in parts by weight: 35-50 parts of cellulose, 20-35 parts of hemicellulose and 15-35 parts of lignin, wherein the artificial timber has a density of 0.01-0.05 g/cm$^3$. The preparing method includes: (1) dissolving 15-35 parts by weight of lignin, 35-50 parts by weight of cellulose and 20-35 parts by weight of hemicellulose with an ionic liquid; (2) cleaning and replacing it with water to obtain a lignocellulose hydrogel; and (3) drying the lignocellulose hydrogel to obtain an artificial timber. The prepared artificial timber is large in specific area, low in density, low in material energy consumption, moderate in condition and easy for operation. The obtained artificial timber is regular in shape and shaped like a sandy beige cylinder without obvious damage and deformation, which indicates that such artificial timber with high specific area has well molding capacity.

7 Claims, 5 Drawing Sheets

ARTIFICIAL TIMBER AND METHOD FOR PREPARING ARTIFICIAL TIMBER

RELATED APPLICATIONS

The present application is a continuation-in-part application of the international application PCT/CN2017/098277 filed Aug. 21, 2017, which claims the benefit of CN201610890490.6 filed Oct. 12, 2016, each of which is incorporated herein by reference in its entirety.

FIELD OF THE INVENTION

The present invention relates to the technical field of artificial timbers, and in particular to an artificial timber and a preparing method thereof.

BACKGROUND OF THE INVENTION

As the petroleum resources are disappearing rapidly, petrochemical products are consumed and environmental pollution is caused thereby, the whole world begins to pay attention to renewable wood biomass resources, mainly focusing on timber. Except for naturalness and renewability, the timber has many other advantages, for example, the timber is easy to machine, has a strength weight ratio higher than common metal materials, an air-seasoning material is a good thermal and electrical insulating material, the timber has an action of absorbing ultraviolet and reflecting infrared, and the timber is an elastoplastic material capable of regulating temperature and relieving dampness. Therefore, the timber must be an important research subject in future material science.

However, the timber is still mainly used for traditional industries such as papermaking. With the increase of global population, the amount of paper sheets consumed is also increased greatly. Due to the problem about a growth period of trees per se, the regeneration and utilization of the timber is also the priority among priorities.

The application of timbers mainly utilizes main stems of trees. Thus the barks and branches are abandoned and hardly utilized. Besides, in actual application, due to the use demands and the natural diameter of timbers are limited, all logs need to be machined, which inevitably causes the problems of timber shavings, etc. At present, the most direct method to solve the problem is to manufacture the timber into artificial boards, which usually requires adhesive and a high temperature thermo-pressing process. Even the adhesive-free artificial boards without the adhesive added inevitably needs to be manufactured by using a large-sized thermocompressor device under a high temperature thermo-pressing condition. Therefore, it is very important for the future development of the timber industry to manufacture the timer materials under an environment-friendly room temperature condition.

The main chemical components of the timber are substances forming cell walls and intercellular layers of the timber, and are formed by three high molecular compounds including cellulose, hemicellulose and lignin, and the total weight generally occupies more than 90% of the timber.

The separation technologies for the cellulose, the lignin and the like of the timber materials are mature. Therefore, it is very important to regain an available artificial timber by using the cellulose, semicellulose and the like.

An artificial timber is formed by extracting lignin from natural timber and winding around fibers utilizing the viscidity of the lignin to coagulate the fibers together. The obtained material has the prominent characteristics of easiness in molding, excellent performances, and capability of being decomposed in natural environment.

In order to reassemble the cellulose, the lignin and the hemicellulose into a whole macroscopic object, they can be dissolved and then assembled into a new timber product. Ionic liquid is an environment-friendly room temperature solvent, has better solubility for the cellulose and the lignin, and can dissolve them into a nanometer or even molecular level, which is more favorable for their reassembly and uniform coagulation. Meanwhile, recycling of the ionic liquid is also a mature technology. Therefore, it is a simple-to-operate and environment-friendly manner to use the ionic liquid to regain the available material from the cellulose and the lignin. The high temperature and high pressure conditions and usage of a large-sized thermocompressor device are also avoided. However, in prior art, the ionic liquid is used to dissolve the timber, but only an "aerogel" timber product can be prepared, and it is merely limited to low value products such as sound absorbing boards. So far, in the prior art, the ionic liquid dissolving technology has not been successfully applied in preparing a real artificial timber.

For the uniform system obtained by dissolving the cellulose and the lignin with the ionic liquid, a solvent replacement process needs to be used to remove the ionic liquid solvent. Usually, acetone-alcohol mixed solutions of different concentrations can be used for replacement and dissolving to finally obtain the timber products having a uniform fiber network. However, the materials obtained in such manner have a single structure and lower material strength and tenacity. There is no breakthrough for how to construct a multi-pore passage having a structure of enhanced particles in the field. Therefore, it is very important for constructing a high-performance artificial timber of a porous structure by determining a component ratio of raw materials and designing a reasonable replacement solvent system and conditions.

OBJECTS AND SUMMARY OF THE INVENTION

In order to overcome the shortcomings existed in the prior art, according to the present invention, an environment-friendly ionic liquid processing system is used, and the component ratio, the replacement solvent system of the ionic liquid and replacement conditions are deeply studied, and unexpectedly a nanofiber crosslinking microparticle-structured porous artificial timber is obtained. Comparing with the traditional adhesive-free timber product, the artificial material assembled by nano-molecules contains lots of pores to prevent expansion after the material absorbs water. Comparing with the natural timber and existing artificial timber, thanks to the nanofiber crosslinking microparticle structure, the artificial timber according to the present invention has a higher specific area, higher compression resistance, lower density and lower water absorbing expansion rate.

In one aspect, the present invention provides an artificial timber, comprising the following components in parts by weight: 35-50 parts of cellulose, 20-35 parts of hemicellulose and 15-35 parts of lignin, wherein a density of the artificial timber is 0.01-0.05 $g/cm^3$.

According to the artificial timber of the present invention, wherein the artificial timber comprises the following components in parts by weight: 42 parts of cellulose, 27 parts of hemicellulose and 28 parts of lignin.

According to the artificial timber of the present invention, wherein the artificial timber has a density of 0.02-0.04 g/cm³.

According to the artificial timber of the present invention, wherein the artificial timber has a specific area of 190-240 m²/g.

According to the artificial timber of the present invention, wherein, the artificial timber has a 24 h water-absorbing expansion rate of 0.2%.-0.5%.

According to the artificial timber of the present invention, wherein the artificial timber has a compressed yield stress of 0.6-5 MPa. The artificial timber has a compression strength of 3-5 MPa.

According to the artificial timber of the present invention, wherein compression resistance of the artificial timber meets: the integrality is still maintained when suffering a deformation of larger than or equal to 80%.

According to the artificial timber of the present invention, wherein durability of the artificial timber meets: not dispersing after being boiled in boiling water for two hours.

In a preferable embodiment, the artificial timber has a density of 0.01-0.05 g/cm³, a specific area of 190-240 m²/g; a 24 h water-absorbing expansion rate of 0.2%-0.5%; a compressed yield stress of 0.6-5 MPa; a compression strength of 3-5 MPa; the compression resistance of the artificial timber meets: the integrality is maintained when suffering a deformation of larger than or equal to 80%; and the durability of the artificial timber meets: not dispersing after being boiled in boiling water for two hours.

In a second aspect, the present invention further provides a preparing method for an artificial timber, and the preparing method comprises the following steps:
(1) dissolving 15-35 parts by weight of lignin, 35-50 parts by weight of cellulose and 20-35 parts by weight of hemicellulose with an ionic liquid;
(2) cleaning and replacing it with water to obtain lignocellulose hydrogel; and
(3) drying the lignocellulose hydrogel to obtain an artificial timber.

According to the preparing method of the present invention, wherein the step (1) comprises: mixing the cellulose, hemicellulose and lignin in a weight ratio to form the lignocellulose; and adding the lignocellulose into an ionic liquid and heating and stirring for dissolving to obtain lignocellulose ionic liquid dispersion.

Wherein the ionic liquid is one or more of 1-butyl-3-methylimidazole hexafluorophosphate, 1-butyl-3-methylimidazole chloride, 1-allyl-3-methylimidazole chloride, 1-benzyl-3-methylimidazole chloride and 1-ethyl-3-methylimidazole phosphate.

Wherein a temperature of the heating and stirring is 50-200° C., and time of the heating and stirring time is 2-24 h.

According to the preparing method of the present invention, wherein, the step (2) comprises: cleaning and replacing the lignocellulose ionic liquid dispersion with water to obtain lignocellulose hydrogel, wherein the water is deionized water, distilled water or ultrapure water. The number of times of the cleaning and replacing is 1-99 times, and time for every time is 0.5-99 h.

According to the preparing method of the present invention, wherein the drying processing in step (3) is one of critical point drying, freezing drying or supercritical drying. Preferably, the drying time in step (3) is 1-1000 h.

In the preferable embodiment according to the preparing method of the present invention, step (1) comprises: mixing the cellulose, the hemicellulose and the lignin according to a weight ratio to form lignocellulose; adding the lignocellulose into an ionic liquid and heating and stirring for dissolving to obtain a lignocellulose ionic liquid dispersion, wherein the ionic liquid is one or more of 1-butyl-3-methylimidazole hexafluorophosphate, 1-butyl-3-methylimidazole chloride, 1-allyl-3-methylimidazole chloride, 1-benzyl-3-methylimidazole chloride and 1-ethyl-3-methylimidazole phosphate, the temperature of the heating and stirring is 50-200° C., and time of the heating and stirring is 2-24 h; in step (2), the water is deionized water, distilled water or ultrapure water, the number of times of the cleaning replacement is 1-99 times, and the time for every time is 0.5-99 h; and in step (3), the drying processing is one of critical point drying, freezing drying or supercritical drying, and time of the drying is 1-1000 h In the third aspect, the invention further provides an artificial timber, a preparing method for the artificial timber comprises the following steps:
(1) dissolving 15-35 parts by weight of lignin, 35-50 parts by weight of cellulose and 20-35 parts by weight of hemicellulose with an ionic liquid;
(2) cleaning and replacing it with water to obtain lignocellulose hydrogel; and
(3) drying the lignocellulose hydrogel to obtain an artificial timber;
wherein step (1) comprises: mixing the cellulose, the hemicellulose and the lignin according to a weight ratio to form lignocellulose; adding the lignocellulose into an ionic liquid and heating and stirring for dissolving to obtain a lignocellulose ionic liquid dispersion, wherein the ionic liquid is one or more of 1-butyl-3-methylimidazole hexafluorophosphate, 1-butyl-3-methylimidazole chloride, 1-allyl-3-methylimidazole chloride, 1-benzyl-3-methylimidazole chloride and 1-ethyl-3-methylimidazole phosphate, the temperature of the heating and stirring is 50-200° C., and time of the heating and stirring is 2-24 h; in step (2), the water is deionized water, distilled water or ultrapure water, the number of times of the cleaning replacement is 1-99 times, and the time for every time is 0.5-99 h; and in step (3), the drying processing is one of critical point drying, freezing drying or supercritical drying, and time of the drying is 1-1000 h.

The natural timber is a timber having excellent performances since the lignin combines the cellulose and the hemicellulose, while the present invention synthesizes an artificial timber having a high surface area using a chemical structure simulating the natural timber, and the problems of high energy consumption and complex manufacturing method in preparation of the high-specific area timber material are solved. The method for preparing the artificial timber of the present invention is simple to operate and low in raw material price and the preparing cost is greatly reduced. The artificial timber of the present invention provides a new thought for recycle use of the timber material. The artificial timber prepared by the present invention is large in specific area, low in density, low in material energy consumption, mild in condition and easy for operation. The artificial timber obtained by the present invention is regular in shape and is shaped like a sandy beige cylinder without obvious damage and deformation, which indicates that such artificial timber with a high specific area has good molding capacity.

The artificial timber provided by the present invention has a tremendous application prospect in the fields of tissue engineering, control-released systems, sensors, agriculture, water purification, chromatographic analysis, super-efficient thermal insulating and sound insulating materials and biological medicine as well as efficiency chargeable batteries, super capacitors, catalysts and carriers, filter materials, etc.

BRIEF DESCRIPTION OF FIGURES

In order to clarify specific embodiments of the present invention or technical solutions in the prior art, the drawings required to be used in the description of the specific embodiments or prior art will be briefly introduced. In all drawings, similar elements or parts are generally marked with similar reference signs. In the drawings, respective elements or parts are unnecessarily drawn according to an actual proportion.

DETAILED DESCRIPTION OF THE EMBODIMENTS

The present invention is further described in detail in combination with specific examples, and the given examples are merely intended to illuminate the present invention instead of limiting a scope of the present invention.

It should be noted that unless otherwise stated, the technical terms or scientific terms used in the present application should have a general meaning understood by those skilled in the art of the present invention.

The present invention provides an artificial timber, comprising the following components in parts by weight: 35-50 parts of cellulose, 20-35 parts of hemicellulose and 15-35 parts of lignin, and preferably comprising the following components in parts by weight: 42 parts of cellulose, 27 parts of hemicellulose and 28 parts of lignin.

Figure 1:
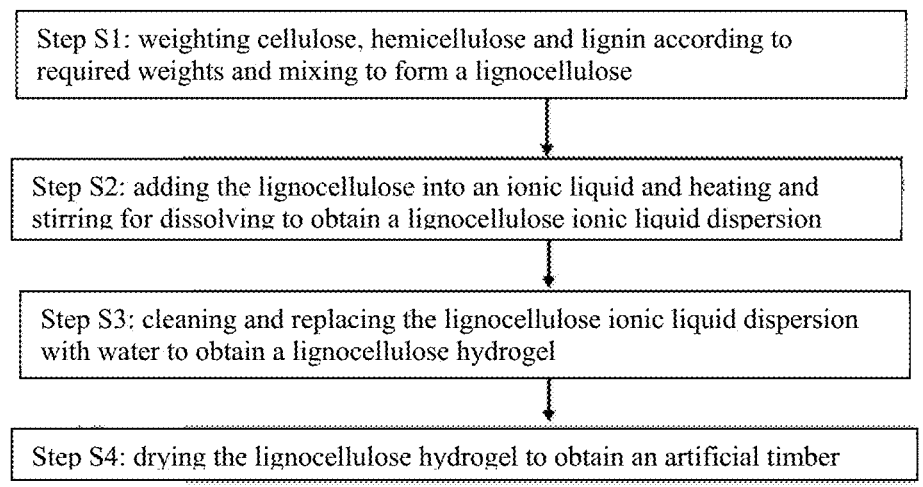
FIG. 1 is a flowchart of the preparing method for an artificial timber of the present invention.
Figure 2:
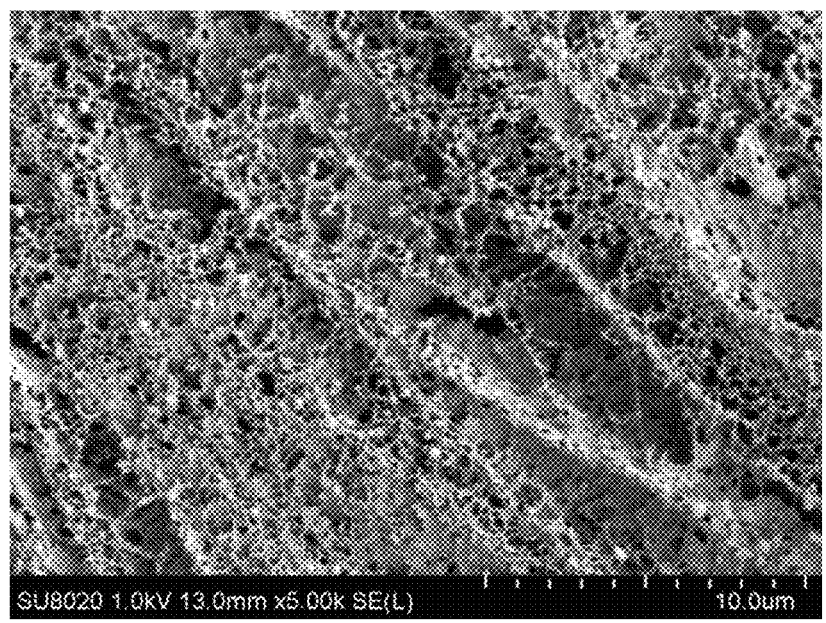
FIG. 2 shows a scanning electron microscope image of the artificial timber prepared in Example 1 of the present invention.

FIG. 1 is a flowchart of a preparing method for an artificial timber of the present invention. Referring to FIG. 1, the method for preparing the artificial timber of the present invention extracts the lignin from natural timber, and coagulates the lignin together with the cellulose and hemicellulose, so as to form an artificial timber, and the method comprises the following steps:

Step S1: weighing the cellulose, hemicellulose and lignin according to required weights and mixing to form a lignocellulose.

Step S2, adding the lignocellulose into an ionic liquid and heating and stirring for dissolving to obtain a lignocellulose ionic liquid dispersion.

Wherein, the ionic liquid is selected from one or more of 1-butyl-3-methylimidazole hexafluorophosphate, 1-butyl-3-methylimidazole chloride, 1-allyl-3-methylimidazole chloride, 1-benzyl-3-methylimidazole chloride and 1-ethyl-3-methylimidazole phosphate under room temperature.

Wherein a temperature of the heating and stirring is 50° C.–200° C., and the heating and stirring time is 2-24 h.

Step S3, cleaning and replacing the lignocellulose ionic liquid dispersion with water to obtain a lignocellulose hydrogel.

Wherein, the water comprises deionized water, distilled water or ultrapure water.

Wherein, the number of times of the cleaning and replacing is 1-99 times, and time for every time is 0.5-99 h.

Step S4, drying the lignocellulose hydrogel to obtain an artificial timber. Wherein the drying processing comprises any one of critical point drying, freezing drying or supercritical drying, and the drying time is 1 h-1000 h.

Example 1

The artificial timber of the present example comprises the following components in parts by weight: 35 parts of cellulose, 20 parts of hemicellulose and 15 parts of lignin, and the preparing method comprises the steps as follows:

1. Weighing the cellulose, hemicellulose and lignin according to the required weights and mixing to form a lignocellulose, adding 7 g of the lignocellulose into 100 ml of 1-butyl-3-methylimidazole hexafluorophosphate, and heating and stirring for dissolving to obtain a lignocellulose ionic liquid dispersion, wherein the temperature of the heating and stirring is 50° C., and the time for heating and stirring is 24 h;

2. cleaning and replacing the lignocellulose ionic liquid dispersion with 500 ml of deionized water to obtain a lignocellulose hydrogel, wherein the number of times of the cleaning and replacing is 1 time, and time for every time is 99 h;

3. performing critical point drying on the lignocellulose hydrogel to obtain an artificial timber according to the present invention, wherein the drying time is 1 h.

Example 2

The artificial timber of the present example comprises the following components in parts by weight: 38 parts of cellulose, 23 parts of hemicellulose and 19 parts of lignin, and the preparing method comprises the steps as follows:

1. Weighing the cellulose, hemicellulose and lignin according to the required weights and mixing to form a lignocellulose, adding 8 g of the lignocellulose into 100 ml of 1-butyl-3-methylimidazole chloride, and heating and stirring for dissolving to obtain a lignocellulose ionic liquid dispersion, wherein the temperature of the heating and stirring is 90° C., and the time for heating and stirring is 18 h;

2. cleaning and replacing the lignocellulose ionic liquid dispersion with 500 ml of distilled water to obtain a lignocellulose hydrogel, wherein the number of times of the cleaning and replacing is 5 times, and the time for every time is 90 h;

3. performing freezing drying on the lignocellulose hydrogel to obtain an artificial timber according to the present invention, wherein the drying time is 50 h.

Example 3

The artificial timber of the present example comprises the following components in parts by weight: 42 parts of cellulose, 27 parts of hemicellulose and 28 parts of lignin, and the preparing method comprises the steps as follows:

1. Weighing the cellulose, hemicellulose and lignin according to the required weights and mixing to form a lignocellulose, adding 9.7 g of the lignocellulose into 100 ml of 1-allyl-3-methylimidazole chloride, and heating and stirring for dissolving to obtain a lignocellulose ionic liquid dispersion, wherein the temperature of the heating and stirring is 120° C., and the time for heating and stirring is 15 h;

2. cleaning and replacing the lignocellulose ionic liquid dispersion with 800 ml of ultrapure water to obtain a lignocellulose hydrogel, wherein the number of times of the cleaning and replacing is 40 times, and the time for every time is 80 h;

3. performing supercritical drying on the lignocellulose hydrogel to obtain an artificial timber according to the present invention, wherein the drying time is 100 h.

Example 4

The artificial timber of the present example comprises the following components in parts by weight: 44 parts of cellulose, 29 parts of hemicellulose and 32 parts of lignin, and the preparing method comprises the steps as follows:

1. Weighing the cellulose, hemicellulose and lignin according to the required weights and mixing to form a lignocellulose, adding 10.5 g of the lignocellulose into 120 ml of 1-benzyl-3-methylimidazole chloride, and heating and stirring for dissolving to obtain a lignocellulose ionic liquid dispersion, wherein the temperature of the heating and stirring is 150° C., and the time for heating and stirring is 10 h;

2. cleaning and replacing the lignocellulose ionic liquid dispersion with 1000 ml of deionized water to obtain a lignocellulose hydrogel, wherein the number of times of the cleaning and replacing is 60 times, and the time for every time is 12 h;

3. performing critical point drying on the lignocellulose hydrogel to obtain an artificial timber according to the present invention, wherein the drying time is 500 h.

Example 5

The artificial timber of the present example comprises the following components in parts by weight: 50 parts of cellulose, 35 parts of hemicellulose and 35 parts of lignin, and the preparing method comprises the steps as follows:

1. Weighing the cellulose, hemicellulose and lignin according to the required weights and mixing to form lignocellulose, adding 12 g of the lignocellulose into 150 ml of 1-ethyl-3-methylimidazole phosphate, and heating and stirring for dissolving to obtain a lignocellulose ionic liquid dispersion, wherein the temperature of the heating and stirring is 200° C., and the time for heating and stirring is 5 h;

2. cleaning and replacing the lignocellulose ionic liquid dispersion with 1000 ml of ultrapure water to obtain a lignocellulose hydrogel, wherein the number of times of the cleaning and replacing is 99 times, and the time for every time is 0.5 h;

3. performing supercritical drying on the lignocellulose hydrogel to obtain an artificial timber according to the present invention, wherein the drying time is 1000 h.

Performance Test

For the artificial timber prepared in Examples 1-3 of the present invention, four samples are taken respectively for compression performance test, and test conditions and results are shown in Table 1.

TABLE 1

| Item | Sample diameter/mm | Maximal force/ kN | Compression yield stress/ MPa | Compression strength/MPa | Sample height/mm | Compression modulus/ kN · m$^{-2}$ |
|---|---|---|---|---|---|---|
| Example 1 | 19.60 | 1.00 | 0.69 | 3.31 | 6.70 | 1282 |
| Example 2 | 19.00 | 1.00 | 3.52 | 3.52 | 8.30 | 25380 |
| Example 3 | 17.00 | 1.00 | 4.40 | 4.40 | 5.80 | 42211 |

For the artificial timber prepared in Examples 1-3 of the present invention, four samples are taken respectively for tests on sample density, water absorbing expansion rate, compression resistance and durability, and the results are shown in Table 2.

TABLE 2

| Item | Sample density g/cm$^3$ | Specific area m$^2$/g | Water absorbing expansion rate | Compression resistance | Durability |
|---|---|---|---|---|---|
| Example 1 | 0.024 | 235.9 | 0.5% | Integrity is still maintained when deformation is larger than >80% | Not dispersing after being boiled in boiling water for 2 h |
| Example 2 | 0.029 | 226.7 | 0.4% | Integrity is still maintained when deformation is larger than >80% | Not dispersing after being boiled in boiling water for 2 h |
| Example 3 | 0.040 | 198 | 0.2% | Integrity is still maintained when deformation is larger than >80% | Not dispersing after being boiled in boiling water for 2 h |

Note:
1. the method for testing the water absorbing expansion rate is as follows: a dry sample is soaked for 24 h in a position lower than the water surface by 3 cm by using a water tank, then the change of the sample volume is tested, and the water absorbing expansion rate is the ratio of the volume change value to the volume value of the original material;
2. the specific area is tested by an isothermal nitrogen gas desorption and absorption experiment and the detecting temperature is 77 K.

Figure 3:
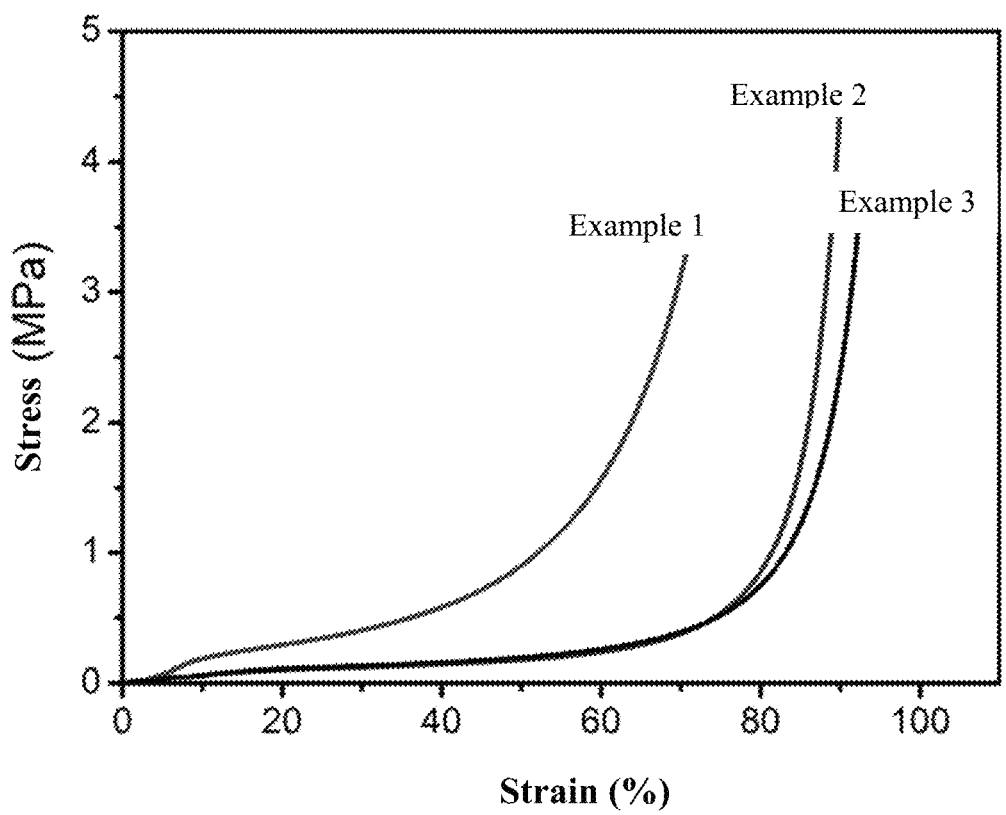
FIG. 3 shows a strain-stress curve graph of the artificial timber prepared in Examples 1-3 of the present invention.

FIG. 3 shows a strain-stress curve graph for the artificial timbers prepared in Examples 1-3 of the present invention. Referring to FIG. 3 and Table 1, it can be seen that the artificial timber prepared by the method of the present invention has a higher specific area.

Rift grain compression test is performed on the artificial timber prepared by the present invention and the natural timber respectively to compare the mechanical properties of them. The artificial timber prepared by Example 4 and the natural timber are taken, to respectively serve as rift grain compression test pieces, wherein the cross-sectional size of the artificial timber and the natural timber is 16 mm×16 mm, and the length is 270 mm.

The timber rift grain compression mechanical test adopts a universal mechanics test machine, and in order to ensure press rod stability, the universal mechanics test machine is equipped with a rift grain compression die. In order to obtain the maximal rift grain compression of the samples and a more appropriate rift grain compression rate for multidimensional bending, a rift grain compression speed is set to be 2 mm/min, and the artificial timber and the natural timber are subjected to rift grain compression respectively.

The test data is analyzed by a regression analysis method, and a regression relation function expression between a dependent variable and an independent variable is constructed with a statistical method. The strain-stress relation of the timber in each stage is calculated by an image data analysis software package "S-PLUS."

Figure 4:
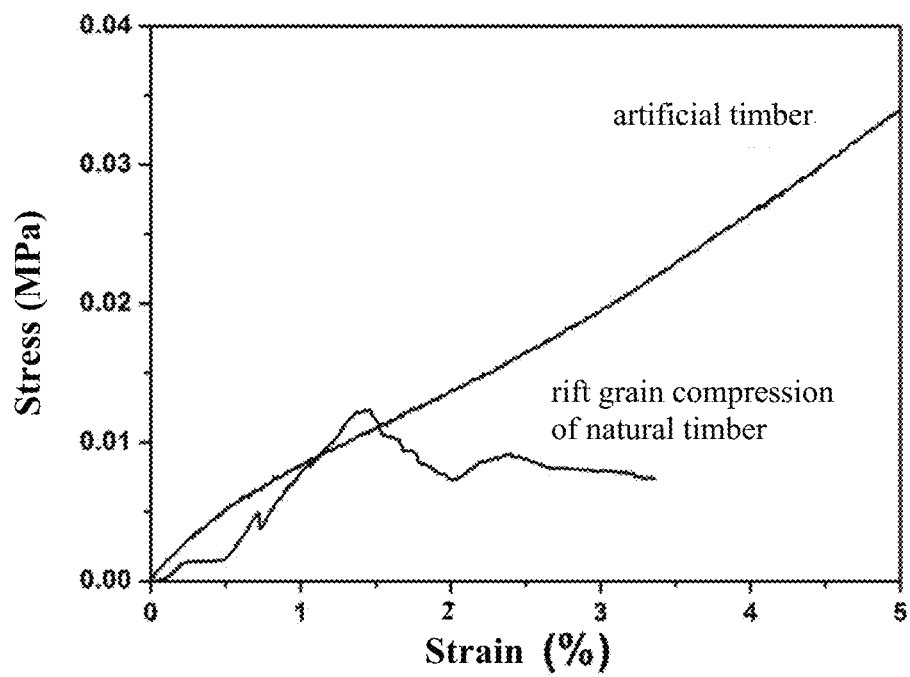
FIG. 4 shows a strain-stress curve graph for the artificial timber prepared in Example 4 of the present invention and a natural timber.

FIG. 4 shows a strain-stress curve graph for the artificial timber prepared in Example 4 of the present invention and a natural timber. Referring to FIG. 4, by testing the stress and strain values of the artificial timber and the natural timber, the stress-strain curve corresponding thereto is shown in FIG. 4. It can be seen that during the compression test, the artificial timber generally shows higher stress than the natural timber under the same stress. During the test process, when the strain is about 1.5%, the natural timber has ruptured, and is severely damaged when the strain is more than 3% (the test ends). But in the whole test process, no obvious damage to the artificial timber of the present invention is caused, and it can be seen that the tenacity of the artificial timber is obviously higher than the natural timber.

Figure 5:
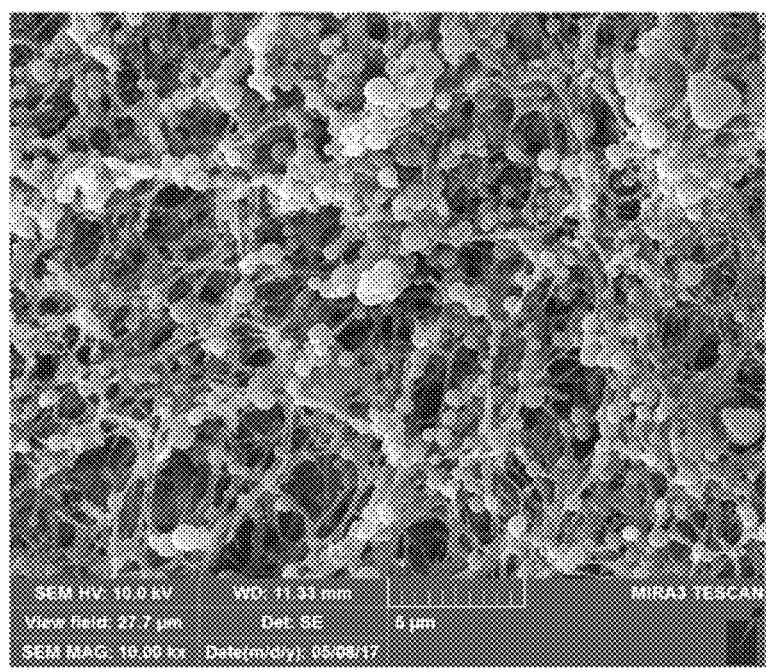
FIG. 5 is an SEM image of the artificial timber prepared in Example 2 of the present invention.

FIG. 5 is an SEM image of the artificial timber prepared in Example 2 of the present invention. From FIG. 5, it can be seen that the structure of the artificial timber is different from the single fiber structure, but is a composite structure formed by winding the microparticle lignin with lots of fibers, the micro lignin particles can cause the fibers to be adhered to firmly combine the fibers with the particles, and can bring about higher mechanical property than uniform single fibers.

It should be noted finally that the above respective examples are merely intended to explain the technical solution of the present invention rather than limiting the same. Although the present invention is explained in detail with reference to the foregoing respective embodiments, those ordinary skilled in the art should understand that the technical solutions cited by the foregoing respective embodiments can still be amended, or part or all of technical features therein can be equivalently replaced; while these amendments or replacements do not cause the essence of the corresponding technical solutions to be departed from the scope of the technical solutions of respective embodiments of the present invention, and they should be covered in the scope of claims and specification of the present invention.

What is claimed is:

1. A method for preparing an artificial timber, comprising steps of:
   (1) dissolving 15 to 35 parts by weight of lignin, 35 to 50 parts by weight of cellulose and 20 to 35 parts by weight of hemicellulose to form a lignocellulose, and adding the lignocellulose into an ionic liquid, and heating and stirring for dissolving to obtain a lignocellulose ionic liquid dispersion;
   (2) cleaning and replacing the ionic liquid with water to obtain a lignocellulose hydrogel; and
   (3) drying the lignocellulose hydrogel to obtain an artificial timber.

2. The method in claim 1, wherein the ionic liquid is one or more of 1-butyl-3-methylimidazole hexafluorophosphate, 1-butyl-3-methylimidazole chloride, 1-allyl-3-methylimidazole chloride, 1-benzyl-3-methylimidazole chloride and 1-ethyl-3-methylimidazole phosphate.

3. The method in claim 1, wherein:
   a heating and stirring temperature is 50 to 200° C.; and
   a heating and stirring time is 2 to 24 hours.

4. The method in claim 1, wherein the water in step (2) is deionized water, distilled water or ultrapure water.

5. The method in claim 1, wherein step (2) is repeated 1 to 99 times, each time lasting for 0.5 to 99 hours.

6. The method in claim 1, wherein the drying processing in step (3) is one of critical point drying, freezing drying and supercritical drying.

7. The method in claim 1, wherein a drying time in step (3) is 1 to 1000 hours.

* * * * *